United States Patent [19]

Murata

[11] Patent Number: 5,151,645
[45] Date of Patent: Sep. 29, 1992

[54] CHARGE DEVICE CAPABLE OF LENGTHENING A LIFETIME OF A STORAGE CELL

[75] Inventor: Yukio Murata, Tokyo, Japan
[73] Assignee: NEC Corporation, Tokyo, Japan
[21] Appl. No.: 644,656
[22] Filed: Jan. 23, 1991
[30] Foreign Application Priority Data
  Jan. 23, 1990 [JP] Japan ................... 2-12845
[51] Int. Cl.⁵ ............................. H02J 7/00
[52] U.S. Cl. ....................... 320/23; 320/39
[58] Field of Search ................... 320/22-29, 320/39

[56] References Cited

U.S. PATENT DOCUMENTS

| | | | |
|---|---|---|---|
| 3,668,418 | 6/1972 | Godard | 320/6 X |
| 3,733,534 | 5/1973 | Saslow | 320/23 |
| 4,623,832 | 11/1986 | Fujiwara | 320/48 X |
| 4,888,544 | 12/1989 | Terry et al. | 320/22 X |

Primary Examiner—R. J. Hickey
Attorney, Agent, or Firm—Sughrue, Mion, Zinn, Macpeak & Seas

[57] ABSTRACT

In a charge device having a storage cell terminal (11) to be connected to a storage cell (12) to be charged, a trickle charge terminal (13) for receiving a trickle charge voltage, and a boost charge terminal (14) connected to the storage cell terminal for receiving a boost charge voltage and including a constant current circuit (16) for causing a constant current to flow from the trickle charge terminal to the storage cell terminal, a boost charge detector detects the boost charge voltage to produce a boost charge signal when the boost charge terminal is supplied with the boost charge voltage. An interrrupting circuit interrupts the constant current when the boost charge detector circuit produces the boost charge signal. The constant current circuit may comprise a transistor (161) having a base electrode supplied with the trickle charge voltage to produce the constant current. In this event, the interrupting circuit is a conductor (191) connected between the boost charge detector and the base electrode of the transistor (161).

3 Claims, 2 Drawing Sheets

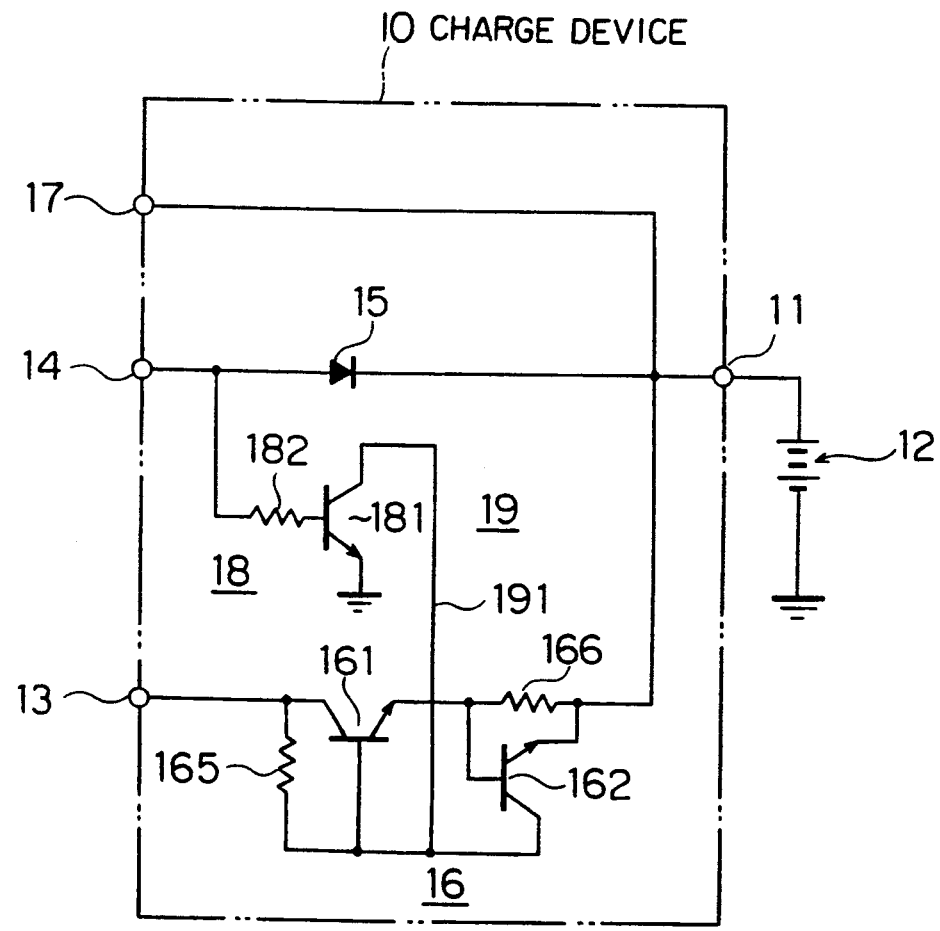
F I G. 2

CHARGE DEVICE CAPABLE OF LENGTHENING A LIFETIME OF A STORAGE CELL

BACKGROUND OF THE INVENTION

The present invention relates to a charge or charging device for charging a storage cell.

A conventional charge device has a storage cell terminal to be connected to the storage cell, a trickle charge terminal for receiving a trickle charge voltage of a power supply, a boost charge terminal connected to the storage cell terminal for receiving a boost charge voltage of a boost charge circuit, and a constant current circuit connected between the storage cell terminal and the trickle charge terminal for causing a constant current to flow from the trickle charge terminal to the storage cell terminal.

In the conventional charge device, the boost charge circuit includes a charge completion detector for detecting a change in a terminal voltage of the storage cell to produce a charge completion signal when the change becomes larger than a reference level. In the conventional charge device, both the boost charge voltage and the trickle charge voltage are supplied to the storage cell. Inasmuch as the boost charge circuit charges the storage cell while the storage cell is supplied with the trickle charge voltage, the rate of the change of the terminal voltage becomes slower. A the charge completion detector detects the slow rate of the change. As a result, the storage cell is charged too much and the lifetime of the storage cell is decreased.

SUMMARY OF THE INVENTION

It is therefore an object of the present invention to provide a charge device which is capable of lengthening the lifetime of the storage cell.

Other object of this invention will become clear as the description proceeds.

On describing the gist of this invention, it is possible to understand that a charge device includes a storage cell terminal to be connected to a storage cell to be charged, a trickle charge terminal for receiving a trickle charge voltage, a boost charge terminal connected to the storage cell terminal for receiving a boost charge voltage, and a constant current circuit connected between the storage cell terminal and the trickle charge terminal for causing a constant current to flow from the trickle charge terminal to the storage cell terminal.

According to this invention, the above-described charge device comprises boost charge detector means connected to the boost charge terminal for detecting the boost charge voltage to produce a boost charge signal when the boost charge terminal is supplied with the boost charge voltage, and interrupting means connected to the boost charge detector means and the constant current circuit for interrupting the constant current when the boost charge detector means produces the boost charge signal.

BRIEF DESCRIPTION OF THE DRAWING

FIG. 2 is a circuit diagram of the charge device illustrated in FIG. 1.

DESCRIPTION OF THE PREFERRED EMBODIMENT

Figure 1:
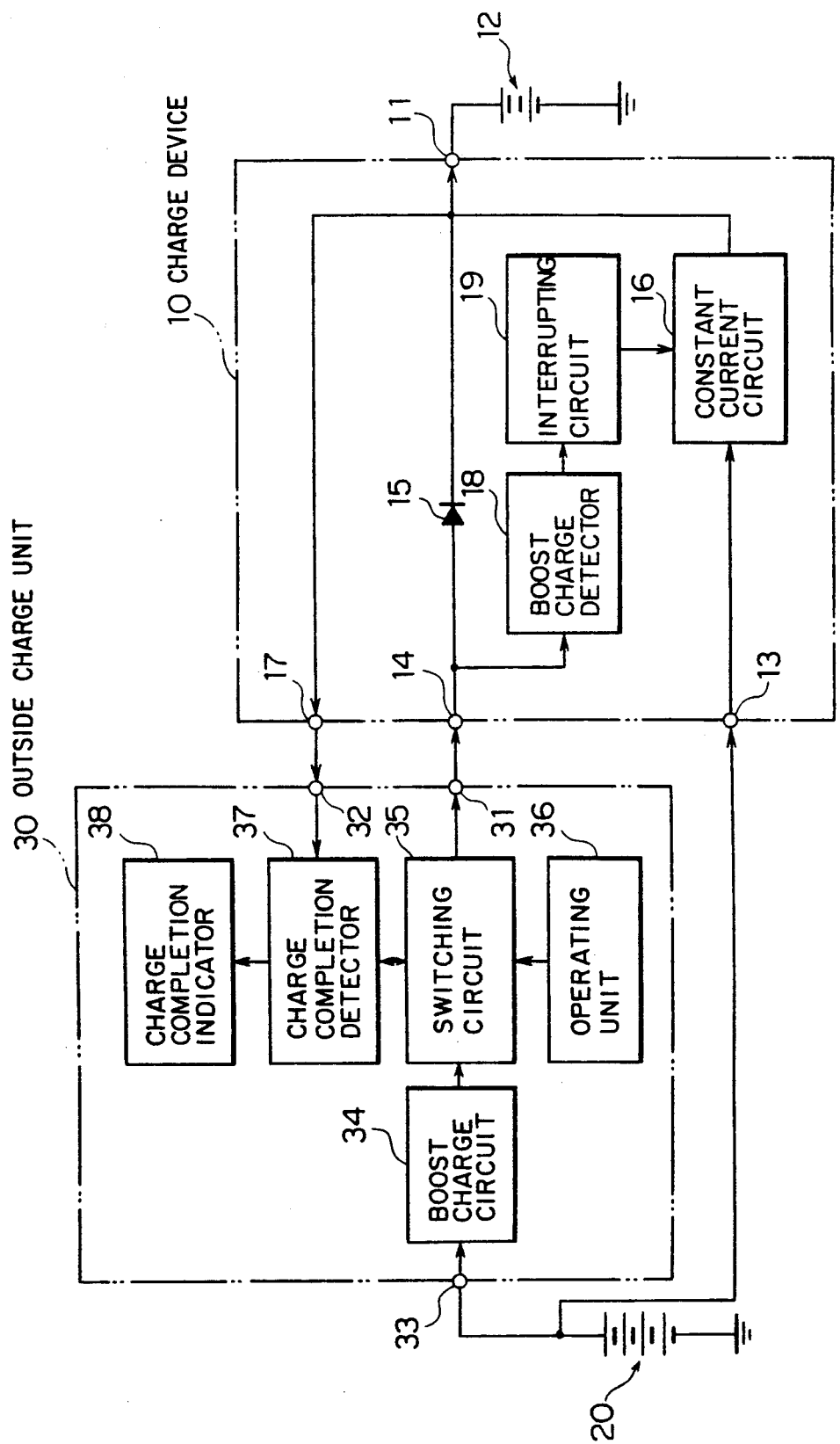
FIG. 1 is a block diagram of a charge device according to an embodiment of this invention.

Referring to FIG. 1, a charge device 10 according to a preferred embodiment of this invention has a storage cell terminal 11 for connection to a storage cell 12 to be charged, a trickle charge terminal 13 for receiving a trickle charge voltage, and a boost charge terminal 14 connected through a diode 15 to the storage cell terminal 11 for receiving a boost charge voltage which will presently be described. A constant current circuit 16 is connected between the storage cell terminal 11 and the trickle charge terminal 13 for causing a constant current to flow from the trickle charge terminal 13 to the storage cell terminal 11. The charge device furthermore has a charge detecting terminal 17 connected to the storage cell terminal 11.

The charge device 10 has a boost charge detector 18 connected to the boost charge terminal 14 for detecting the boost charge voltage so as to produce a boost charge signal when the boost charge terminal 14 is supplied with the boost charge voltage. An interrupting circuit 19 is connected to the boost charge detector 18 and the constant current circuit 16 for interrupting the constant current when the boost charge detector 18 produces the boost charge signal.

The trickle charge terminal 13 is connected to a power supply 20 which may include a vehicle battery and is supplied with a supply voltage of the power supply 20 as the trickle charge voltage. The boost charge terminal 14 and the charge detecting terminal 17 are connected to a boost charge output terminal 31 and a charge detecting voltage input terminal 32 of an outside charge unit 30. The outside charge unit 30 is connected through a boost charge input terminal 33 to the power supply 20. The outside charge unit 30 may be employed for miniaturizing the charge unit 10 and reducing the weight of the same.

The outside charge unit 30 includes a boost charge circuit 34 connected to the boost input terminal 33, a switching circuit 35 connected between the boost charge circuit 34 and the boost charge output terminal 31, an operating unit 36 connected to the switching unit 35 for producing a start signal, a charge completion detector 37 connected between the switching circuit 35 and the charge detecting voltage input terminal 32, and a charge completion indicator 38 connected to the charge completion detector 37.

The boost charge circuit 34 is supplied with the supply voltage of the power supply 20 to produce the boost charge voltage having a voltage level which is higher than a voltage level of a terminal voltage of the storage cell 12. The switching circuit 35 turns on when the switching circuit 35 is supplied with the start signal from the operating unit 36 and turns off when the switching circuit 35 is supplied with a charge completion signal from the charge completion detector 37. While the switching circuit 35 is on, the boost charge terminal 14 is supplied with the boost charge voltage from the boost charge circuit 34 through the switching circuit 35 and the boost charge output terminal 31.

The charge completion detector 37 is supplied with the terminal voltage of the storage cell 12 through the storage cell terminal 11, the charge detecting terminal 17, and the charge detecting voltage input terminal 32. The charge completion detector 37 detects a change in the terminal voltage of the storage cell 12 to produce the charge completion signal in response to a completion of a charge of the storage cell 12 when the change of the terminal voltage is larger than a reference level. The charge completion indicator 38 is supplied with the charge completion signal to indicate the completion of the charge of the storage cell 12. The charge completion detector 37 may be similiar to a charge detecting circuit disclosed in the copending application which claims the priority in Japanese Patent Application No. 171988/1989 and is incorporated by reference herein.

Turning to FIG. 2, the charge device 10 will be described in greater detail. The constant current circuit 16 has a first transistor 161 which has a collector electrode connected to the trickle charge terminal 13. A second transistor 162 has a base electrode connected to an emitter electrode of the first transistor 161, a collector electrode connected to a base electrode of the first transistor 161, and an emitter electrode connected to the storage cell terminal 11. A first resistor 165 is connected between the collector and the base electrodes of the first transistor 161. A second resistor 166 is connected between the base and the emitter electrodes of the second transistor 162.

In the constant current circuit 16, a resistor current in the second resistor 166 becomes larger when an internal resistance of the storage cell 12 becomes smaller. A resistor voltage across the second resistor 166 becomes higher and an internal resistance of the second transistor 162 becomes smaller. As a result, a base voltage of the base electrode of the first transistor 161 becomes lower and an internal resistance of the first transistor 161 becomes larger. Therefore, the constant current circuit 16 causes the constant current to flow from the trickle charge terminal 13 to the storage cell terminal 11.

In the constant current circuit 16, the resistor current in the second resistor 166 becomes smaller when the internal resistance of the storage cell 12 becomes larger. The resistor voltage across the second resistor 166 becomes lower and the internal resistance of the second transistor 162 becomes larger. As a result, the base voltage of the base electrode of the first transistor 161 becomes higher and the internal resistance of the first transistor 161 becomes smaller. Therefore, the constant current circuit 16 causes the constant current to flow from the trickle charge terminal 13 to the storage cell terminal 11.

The constant current circuit 16 is supplied with the supply voltage of the power supply 20 (FIG. 1) as the trickle charge voltage through the trickle charge terminal 13 to supply the constant current to the storage cell terminal 11.

The boost charge detector 18 has a third transistor 181 which has an emitter electrode connected to ground and a base electrode connected through a resistor 182 to the boost charge terminal 14. The interrupting circuit 19 has a conductor 191 connected between a collector electrode of the third transistor 181 and a point of connection between the base electrodes of the first transistor 161 and the collector electrode of the second transistor 162.

Inasmuch as the third transistor 181 turns on state when the boost charge terminal 14 is supplied with the boost charge voltage, the base electrode of the first transistor 161 is connected to ground through the conductor 191 and the third transistor 181. As a result, the first transistor 161 becomes off. Therefore, the constant current in the constant current circuit 16 is interrupted. While the boost charge terminal 11 is supplied with the boost charge voltage, the storage cell 12 is supplied only with the boost charge voltage, that is, the storage cell 12 is not supplied with the constant current which would otherwise be supplied from the constant current circuit 16 in response to the trickle charge voltage.

What is claimed is:

1. A charge device comprising:
  a storage cell terminal to be connected to a storage cell to be charged; a trickle charge terminal for receiving a trickle charge voltage;
  a boost charge terminal connected to said storage cell terminal for receiving a boost charge voltage;
  a constant current circuit connected between said storage cell terminal and said trickle charge terminal for causing a constant current to flow from said trickle charge terminal to said storage cell terminal;
  boost charge detector means connected to said boost charge terminal for detecting said boost charge voltage to produce a boost charge signal when said boost charge terminal is supplied with said boost charge voltage; and
  interrupting means connected to said boost charge detector means and said constant current circuit for interrupting said constant current when said boost charge detector means produces said boost charge signal.

2. A charge device as claimed in claim 1, wherein said constant current circuit comprises a transistor having an emitter electrode connected to said storage cell terminal through a resistor, a collector electrode connected to said trickle charge terminal, and a base electrode supplied with said trickle charge voltage through another resistor so as to cause said constant current from said trickle charge terminal to said storage cell terminal and wherein said interrupting means is a conductor connected between said boost charge detector means and the base electrode of said transistor.

3. A charge device comprising:
  charging means for charging a storage cell with a trickle voltage;
  terminal means for receiving a boost voltage and applying the same to said storage cell, said boost voltage being higher than said trickle voltage;
  means for detecting when said storage cell is being charged with said boost voltage, and for producing a detection signal in response thereto;
  means responsive to said detection signal for interrupting the charging of said storage cell by said charging means;
  a power source for applying an output thereof to said charging means; and
  charge unit means for boosting the output of said power source to produce and apply said boost voltage to said terminal means.

* * * * *

UNITED STATES PATENT AND TRADEMARK OFFICE
CERTIFICATE OF CORRECTION

PATENT NO. : 5,151,645

DATED : September 29, 1992

INVENTOR(S) : Yukio MURATA

It is certified that error appears in the above-identified patent and that said Letters Patent is hereby corrected as shown below:

Col. 3, line 60, delete "turns" and insert --assumes an--;

Col. 4, line 4, delete "becomes off" and insert --assumes an off state--;

Signed and Sealed this

Thirtieth Day of November, 1993

Attest:

BRUCE LEHMAN

Attesting Officer

Commissioner of Patents and Trademarks